United States Patent [19]

White

[11] Patent Number: 5,211,974
[45] Date of Patent: May 18, 1993

[54] CONTAINERS AND COMPOSITIONS FOR SEALING THEM

[75] Inventor: Steven A. C. White, Ivinghoe, England

[73] Assignee: W. R. Grace & Co.-Conn., New York, N.Y.

[21] Appl. No.: 762,822

[22] Filed: Sep. 19, 1991

[30] Foreign Application Priority Data

Sep. 28, 1990 [GB] United Kingdom ............... 9021167
Nov. 30, 1990 [GB] United Kingdom ............... 9026053
Jan. 18, 1991 [GB] United Kingdom ............... 9101100

[51] Int. Cl.$^5$ .............................................. B65D 1/00
[52] U.S. Cl. ................................ 426/106; 426/131;
426/392; 426/397; 413/9; 413/10; 413/19;
413/20; 215/349; 215/363; 215/364; 220/378;
220/304; 217/56; 217/3 CV
[58] Field of Search ............... 426/106, 131, 397, 392;
413/9, 10, 19, 20; 215/349, 363, 364; 220/379,
304; 217/56, 3 CV

[56] References Cited

U.S. PATENT DOCUMENTS

| | | | |
|---|---|---|---|
| 2,823,422 | 2/1958 | Schneider | 215/349 |
| 3,498,492 | 3/1970 | McCrea | 217/56 |
| 3,705,122 | 12/1972 | Gwinner | 260/23 X |
| 4,277,431 | 7/1981 | Peller | 264/148 |
| 4,316,941 | 2/1982 | Eguchi | 215/364 |
| 4,321,306 | 3/1982 | Eguchi | 215/364 |
| 4,518,336 | 5/1985 | Alieri | 425/110 |
| 4,592,690 | 6/1986 | Busch | 413/9 |
| 4,833,206 | 5/1989 | Tajima | 525/187 |

FOREIGN PATENT DOCUMENTS

| | | |
|---|---|---|
| 1112023 | 5/1968 | European Pat. Off. . |
| 1112025 | 5/1968 | European Pat. Off. . |
| 0073334 | 3/1983 | European Pat. Off. . |
| 0174032 | 3/1986 | European Pat. Off. . |
| 0207385 | 1/1987 | European Pat. Off. . |
| 0331485 | 9/1989 | European Pat. Off. . |
| 48-14708 | 5/1973 | Japan . |
| 61-152550 | 7/1986 | Japan ................... 220/378 |
| 2108943 | 5/1983 | United Kingdom . |
| 0129309 | 12/1983 | United Kingdom . |
| 0349304 | 1/1990 | United Kingdom ........... 215/349 |

OTHER PUBLICATIONS

Harwick 1982 a manual for the Brewing and Beverage Industries chapter 23 Packaging Materials and Beer Quality.
Derwent Publications Abstract, AN-73-269270 of Japanese Patent Application 48014708.

Primary Examiner—Carolyn Paden
Attorney, Agent, or Firm—John Dana Hubbard; William L. Baker

[57] ABSTRACT

A container system for beer formed of a bottle body, a cap and sealing gasket formed of a blend of butyl rubber and one or more thermoplastic polymers. Preferably, the butyl rubber is present in an amount of from about 20 to about 60% by weight of the composition and the one or more thermoplastic polymers are present in an amount from about 40% to about 80% by weight of the composition. The system provides good sealing properties and prevents oxygen, and chlorinated substances such as chlorinated phenols or anisoles, that may be present in the packaging, from entering the bottle.

7 Claims, No Drawings

CONTAINERS AND COMPOSITIONS FOR SEALING THEM

BACKGROUND OF THE INVENTION

This invention relates to the sealing of beer bottles, and to the compositions for use in this.

A beer bottle is filled with beer and is formed of a bottle body, a cap and a sealing gasket. The body has a neck opening, the cap fits over this opening so as to close it, and the sealing gasket is trapped between the neck opening and the cap.

The gasket must provide a good seal between the body and the cap so as to prevent inward migration of contamination or unwanted outward escape of carbon dioxide. Preventing inward migration is particularly important because beer is very susceptible to the development of off-tastes and these can be caused by a variety of contaminants. For instance the inward migration of oxygen will spoil the flavour as will the inward migration of chlorinated phenols and chlorinated anisoles. Chlorinated phenols are often applied initially as fungicides to wood or other containers in which the beer bottles may be stored, and chlorinated anisoles are often generated as microbial metabolites of the chlorinated phenols.

Unwanted outward migration of carbon dioxide is undesirable since the beer would then acquire a flat taste and texture, and so the seal must withstand moderate pressures, for instance up to about 5 and often about 7 bar without venting. It might be thought that it would be desirable for there to be no sensible upper limit on the pressure that the gasket can withstand without venting. In practice however it is desirable for the gasket to vent at a pressure below a pressure at which the bottle will burst. This is because if a beverage bottle is left in an exposed place, for instance hot sunshine, high pressures can be generated spontaneously. It is desirable that the gasket should vent in preference to the bottle shattering. In practice this means that the gasket should vent before the pressure exceeds around 12 or 13 bar.

The ideal gasket for beer bottles therefore would prevent ingress of oxygen and off flavours and would give a good seal at a moderate internal pressure, typically up to about 5 bar, but would vent at a higher pressure that is below the burst pressure of the bottle, and that is typically in the range 5 to 12 or 13 bar.

The steps of lining the gasket into the cap and of subsequently filling and closing the beer bottles are all conducted at very high speed and so it is necessary that the gasket material should be capable of being used in these high speed processes and that it should give uniform results. For instance it is not satisfactory to use a composition that gives a venting pressure of, for instance, 12 bar in some bottles if it is liable to give venting pressures as low as 9 bar or as high as 15 bar in other bottles since a significant number of the bottles would still be liable to burst and this is unacceptable.

A wide variety of processes and compositions have been proposed for forming the gasket in various container closures, for instance bottle caps. These include plastisols, solutions in organic solvents, aqueous dispersions (including aqueous latices) and mouldable thermoplastic compositions. An early disclosure of the use of thermoplastic compositions for forming container closures is in GB 1,112,023 and 1,112,025. Beer bottles are not mentioned. GB 1,112,023 and 1,112,025 describe a wide variety of ways of introducing the compositions into the cap and a wide variety of thermoplastic compositions that can be used.

Methods that are described in these two patents include inserting and bonding a preformed uniform disc into the cap, inserting and bonding a preformed contoured disc into the cap, flowing a composition into the cap while rotating it and optionally moulding it, flowing a composition into the cap and moulding it while the composition is still hot, inserting a disc of composition carried on a metal plate, transferring composition by a moulding dye and moulding it into the cap, compression moulding the composition into the cap, and so on. In all the examples, the composition was formed into a sheet, discs were cut from it and the discs were then inserted into the caps and cold moulded into the caps. In many of the examples the inserted disc had a diameter substantially the same as the diameter of the cap.

Thermoplastic compositions that were described include blends of ethylene vinyl acetate (EVA) and micro crystalline wax, EVA and low density polyethylene (LDPE) having a melt flow index (MFI) of 7, similar blends containing also butyl rubber having Mooney viscosity of 70, a blend of equal amounts of LDPE having MFI 7 with butyl rubber having Mooney 70, blends of different types of EVA, a blend of LDPE with polyisobutylene, a blend of EVA with ethylene propylene copolymer, an ethylene acrylic acid ester copolymer, a blend of this with LDPE, a blend of LDPE with ethylene propylene copolymer, and a blend of LDPE with chloro sulphonated polyethylene.

Various disclosures of forming gaskets from thermoplastic compositions have appeared from time to time since then and these have listed a wide variety of polymers that can be used. Generally, most of the polymers named above have been listed. An example is EP 331,485 in which molten material is positioned in the cap while still molten (or semi molten) and is moulded into the cap.

In practice, the thermoplastic compositions that have been proposed and used most widely as gaskets for containers are compositions of polyethylenes, ethylene vinyl acetate polymers, and blends thereof. None of the others have attracted any great commercial interest, presumably because of perceived difficulties in making or using the compositions or in their performance.

As indicated, the gasket properties required for beer bottles are quite rigorous. Very good results can be obtained with, for instance, a cap that is a crown closure having a gasket formed of cork lined with aluminium. However this is uneconomic for beer bottle closures and a synthetic polymeric gasket is required.

Of the very wide range of polymeric gasket materials that have been available in recent years, the type that has been used most widely for beer bottles is based on polyvinyl chloride plasticol. However it is well recognised that bottled beer has a relatively short shelf life and can acquire off-tastes on prolonged storage and so a polymeric gasket that permitted a longer shelf life would be highly desirable. Also, the use of polyvinyl chloride in contact with potable or edible materials has in recent years been considered to be undesirable for other reasons and so again it would be desirable to provide beer bottles with an improved type of gasket material.

SUMMARY OF THE INVENTION

According to the invention, a beer bottle filled with beer is formed of a body, a cap and a sealing gasket that is between the body and the cap and that is formed of a polymeric material, and the polymeric material is a thermoplastic composition that is a homogeneous blend of 20 to 60% by weight of butyl rubber and 40 to 80% by weight other thermoplastic polymer.

The invention also includes the use of this thermoplastic composition for forming a gasket in a cap of a bottle that is to be filled with beer, and it includes caps of beer bottles wherein the caps contain a gasket formed of the composition.

The invention also includes a package including one or more such bottles and including also a source of volatile chlorinated phenol or chlorinated anisole.

The invention also includes the use of the defined gasket to provide a seal that withstands internal pressures of up to 5 bar but that vents at internal pressures of between 5 and 12 bar.

The invention also includes a method in which the gasket is formed by placing a molten piece of the thermoplastic composition in the bottle cap and then moulding the composition in the cap to form the desired gasket.

DESCRIPTION OF THE PREFERRED EMBODIMENTS

We surprisingly find that it is possible to formulate gaskets as defined in the invention that give excellent sealing properties for beer in that they are convenient to form and provide excellent resistance to the ingress of contamination that would give off-tastes. In particular, they give excellent protection against ingress of oxygen and also against ingress of volatile chlorinated phenol or chlorinated anisole.

Also it is possible to formulate such gaskets that will provide a seal at moderate internal pressures, of up to around 5 bar, but that will then vent at slightly higher pressures, for instance between 5 and 12 or 13 bar.

In addition to giving good impermeability against ingress of oxygen and chloro anisole, and in addition to giving a satisfactory venting pressure, a further advantage of the compositions according to the invention is that the properties are relatively uniform from one gasket to another. In particular, it is possible to avoid wide variations in the venting pressure.

Since the gasket is not based on polyvinyl chloride, it avoids the disadvantages that are now considered to be associated with polyvinyl chloride gaskets, and additionally it provides better impermeability to oxygen and chlorinated phenols and chlorinated anisoles than the PVC gaskets that have been customarily used in recent years for beer bottle gaskets. The gaskets used in the invention give much better properties in these respects than the thermoplastic gaskets, such as the polyethylene and/or ethylene vinyl acetate gaskets, that have actually been used for proposed for use in various other container closures in recent years.

The body of the beer bottle used in the invention can be any conventional beer bottle body. It is usually made of glass. However it can be of polymeric material provided the material of which the body is formed (including any coating on the polymeric material) is such that the body is substantially impermeable to oxygen and chlorinated phenols and chlorinated anisoles. Thus, the permeability of the body must be sufficiently low that it will not permit leakage of oxygen into the bottle to an extent that significantly reduces the advantages of the impermeable gasket of the invention.

The cap is preferably a crown closure but can be a roll-on or screw-on closure. It is preferably metal but can be plastic, again provided the plastic (including any coating on it) is sufficiently impermeable.

The invention is of particular value where the bottle is of glass and the cap is of metal, especially when the bottle is to be pasteurised after it has been filled with beer and sealed.

Although the invention includes individual bottles and packages in environments that are free of chlorinated phenol or chlorinated anisoles, it also includes packages including a source of chlorinated phenol or chlorinated anisole, and in particular a source that will provide an environment that provides a concentration of trichloro anisole around the bottle of at least $1 \times 10^{-9}$ g/l. For instance the package could be of jute but is normally wood that may have been accidentally contaminated with a chlorinated material previously or, more usually, has been deliberately impregnated with chlorinated phenol to act as a wood preservative and which is therefore contaminated with chlorinated anisolee. The package can be a pallet on which a plurality of bottles are carried, for instance shrink wrapped on to the pallet. Alternatively or additionally the package can be a wooden crate containing the bottles. Alternatively the package can be a transport container that contains the bottles and wood containing chlorinated phenol or anisole, for instance crates or pallets loaded with the bottles.

The amount of butyl rubber is generally at least about 30% but is usually not more than about 50% or 55% by weight of the blend. Preferably it is about 40 to 50% with about 50% often being optimum. The butyl rubber is a copolymer of isoprene and butylene. The molecular weight can be relatively low or relatively high. Generally it is linear, but it can be cross-linked. Generally the rubber has Mooney (ML1+8 at 110° C.) of below 60 and preferably below 56.

When it is particularly important that the gasket should vent at a pressure in the range 5 to 12 bar, the use of butyl rubbers having relatively low molecular weight can be preferred, for instance the rubber can have a defined Mooney value of below 50, generally below 47, most preferably in the range 43 to 47. However a satisfactory combination of impermeability and venting pressure can be achieved at higher Mooney values.

The one or more other thermoplastic polymers in the blend must be selected such that they can be homogeneously blended with the butyl rubber to form a homogeneous melt which can be extruded and moulded into the cap in a convenient manner to form an adherent gasket having the desired properties. The thermoplastic polymers conventionally mentioned in the literature for thermoplastic gaskets can be used for this purpose and, provided they are blended with butyl rubber in the desired proportions, it is relatively easy to select blends that give the surprising combination of good sealing properties and impermeability to chlorinated phenols and chlorinated anisoles.

Preferred thermoplastic materials are polyethylene or polyethylene copolymers with butylene or other lower alkylenes, polypropylene, thermoplastic rubbers, ethylene propylene copolymers, acid modified ethylene propylene copolymers, styrene butadiene rubber, carboxylated styrene butadiene, polyisoprene, styrene isoprene styrene block copolymers, styrene butadiene styrene block copolymers, styrene ethylene butylene styrene block copolymers, polystyrene, ethylene vinyl acetate copolymers, ethylene (meth) acrylate copolymers and ethylene vinyl alcohol copolymers.

Particularly preferred materials comprise polyethylenes. In some instances, it is preferred to use low density polyethylene but in general high density is more suitable, especially when the main requirement is impermeability against the ingress of contamination. The melt flow index is typically in the range 5 to 30.

Blends of polyethylene (usually low density polyethylene), ethylene vinyl acetate and the butyl rubber can be used but it is generally preferred to form the composition solely of polyethylene and butyl rubber.

The gasket can be formed from the thermoplastic composition by placing the polymeric material in the cap and moulding it to form the gasket by various techniques. The presence of the butyl rubber in the thermoplastic composition can make it rather difficult to handle, and this has probably been a disincentive from using butyl rubber previously. The preferred method comprises placing a molten piece of the thermoplastic composition in the cap and then moulding the molten composition. At the time of placement and moulding the composition may be truly molten or may merely be soft.

It is preferred to form a molten mix of the butyl rubber and the thermoplastic polymer or polymers, for instance by melting a preformed mix in a melt extruder and to extrude the mix continuously and to transfer the desired pieces of molten mix direct from the point of extrusion to the individual caps. Processes of this general type are known as the HC (trade mark) cap, the Sacmi (trade mark) and the Zapata (trade mark) processes. Such processes are described in, for instance, U.S. Pat. No. 4,277,431, EP 73334, U.S. Pat. Nos. 3,705,122 and 4,518,336, and EP 207,385. It is particularly preferred to conduct the process as described in EP 331,485.

The dimensions of each cap will be selected according to the dimensions of the bottle and these dimensions, and the amount of thermoplastic composition deposited in each cap, will be conventional.

The following are examples of the invention.

EXAMPLE 1

50 parts by weight high density polyethylene having a density of 0.950 and a melt flow index of 11 dg/min is blended with 50 parts of a low molecular weight isoprene butylene copolymer having Mooney viscosity (ML 1+8 at 110° C.) of 43°to 47° C. The melt is extruded and appropriately sized pieces of the melt are transferred while soft into beer bottle crown caps, where each is moulded into a gasket in a conventional manner. These operations are conducted on a conventional lining machine.

Beer bottles are filled with beer and then closed with the lined caps in conventional manner. They have long shelf storage life.

In order to test the properties of various thermoplastic compositions, a number of laboratory tests were conducted that simulate the conditions to which gaskets would be exposed during use as gaskets in beer bottles. In each of these, blends of the thermoplastic compositions set out below are formed as pellets and then melted in a melt extruder, extruded and inserted into a plurality of bottle crown caps and moulded into annular gaskets, using a commericial lining machine.

The polymeric materials that were used are described by the following abbreviations.

PE1: Low density polyethylene MFI:7, Density: 0.918
PE2: Low density polyethylene MFI;20, Density: 0.918
PE3: High density polyethylene MFI:11, Density 0.950
BU1: Low molecular weight isoprene/butylene copolymer. Mooney viscosity (ML1+8 at 110° C.): 43-47
BU2: High molecular weight isprene/butylene copolymer Mooney viscosity (ML1+8 at 125° ): 46-56
BU3: Cross-linked isoprene/butylene copolymer
EVA1: Ethylene vinyl acetate copolymer 9% vinyl acetate, MFI:9 dg/min
EVA2: Ethylene vinyl acetate copolymer 18% vinyl acetate, MFI:8 dg/min
EVA3: Ethylene vinyl acetate copolymer 28% vinyl acetate, MFI:7 dg/min
SBS: Styrene butadiene styrene block copolymer
EPM: Ethylene propylene rubber
Oil: Mineral oil
PVC: Polyvinyl chloride plastisol commercial composition

EXAMPLE 2

To determine oxygen ingress, the lined caps had a 200 mg film weight and were sealed on to a 30 cl returnable glass bottle filled with carbonated water having very low (5 mg/l) initial oxygen content. The sealed bottles are stored under ambient conditions and are tested for oxygen content at different time intervals as shown in Tables 1 and 2 below.

TABLE 1

| Composition | 1 | 2 | 3 | 4 | 5 | 6 | 7 | 8 | 9 |
|---|---|---|---|---|---|---|---|---|---|
| LDPE 1 | 50 | | | | | | 85 | 60 | |
| LDPE 2 | | 50 | | 50 | | 60 | | | |
| HDPE | | | 50 | | 50 | | | | |
| Butyl 1 | 50 | 50 | 50 | | 20 | | | | |
| Butyl 2 | | | | 50 | | | | | |
| Butyl 3 | | | | | 30 | 40 | | | |
| SBS | | | | | | | 15 | | |
| EVA | | | | | | | | 40 | |
| PVC | | | | | | | | | 100 |

TABLE 2

| Composition | 2 weeks | 1 month | 2 months | 3 months | 4 months | 6 months |
|---|---|---|---|---|---|---|
| 1 | 9 | 22 | 48 | 72 | 106 | 157 |
| 2 | 13 | 29 | 49 | 76 | 110 | 152 |
| 3 | 15 | 20 | 37 | 38 | 59 | 112 |
| 4 | 22 | 25 | 49 | 53 | 85 | 161 |
| 5 | 47 | 73 | 95 | 67 | 68 | 166 |
| 6 | 63 | 38 | 67 | 63 | 88 | 176 |
| 7 | — | 153 | 285 | — | — | — |
| 8 | 27 | 80 | 188 | 282 | 327 | — |
| 9 | 90 | 179 | 401 | 590 | 774 | 1114 |

This shows that the six compositions containing butyl rubber provide a much better barrier against ingress of oxygen than the other thermoplastic compositions that are tested, and, especially, much better than the commercial PVC compositions. It also shows that the best results in this test are obtained using a blend of high density polyethylene with low molecular weight butyl rubber (composition 3).

EXAMPLE 3

In this test, the resistance of the gasket against ingress of trichloro anisole (TCA) is determined.

The lined crowns are closed on to glass bottles containing carbonated water having a carbonation level of 2.7 volumes and treated with 5% by volume ethanol in order to simulate beer. The bottles are then stored for 14 days at 30° C. in an atmosphere containing 200 μg/l 2,4,6-trichloroanisole (TCA). The bottles are then analysed for TCA content. The results are set out in the following table.

As a comparison, it should be noted that when a foamed plasticised PVC gasket is subjected to the same test, the measured TCA content at the end of the storage period is 123 ng/l.

The results are set out in Table 3.

TABLE 3

|  | A | B | C | D | E | F |
|---|---|---|---|---|---|---|
| PE1 | 50 | — | — | — | — | — |
| PE2 | — | 50 | — | 50 | 50 | 50 |
| PE3 | — | — | 50 | — | — | — |
| BU1 | 50 | 50 | 50 | — | 20 | — |
| BU2 | — | — | — | 50 | — | — |
| BU3 | — | — | — | — | 30 | 40 |
| TCA Content (ng/l) | <1 | <1 | <1 | <1 | <1 | 12 |

|  | G | H | I | J | K | L |
|---|---|---|---|---|---|---|
| PE1 | 100 | — | 50 | — | — | — |
| PE2 | — | — | — | 40 | 50 | 60 |
| EVA1 | — | 100 | 50 | — | — | — |
| EVA2 | — | — | — | 20 | — | — |
| BU1 | — | — | — | 40 | 50 | 40 |
| TCA Content (ng/l) | 1005 | 1160 | 370 | <2 | <2 | <2 |

EXAMPLE 4

In this test, the venting pressure of the compositions is determined. The lined crowns were closed on to glass bottles containing carbonated water having a carbonation level of 2.7 volumes giving a pressure of 2.2 bar at room temperature.

After a storage time of 24 hours at room temperature, the venting pressures were measured using an Owens-Illinois Secure Seal tester and the venting pressure for a range of crown closures was observed and the maximum, minimum and means values were recorded. The results are as follows in which polymer proportions are in parts by weight and pressures (mean, maximum and minimum) are in bars.

TABLE 4

| LDPE 1 | 100 | 90 | 80 | — | 70 | — | 50 | — |
|---|---|---|---|---|---|---|---|---|
| HDPE | — | — | — | 80 | — | 70 | — | 50 |
| Butyl 1 | — | 10 | 20 | 20 | 30 | 30 | 50 | 50 |
| Mean | 13+ | 12.9 | 10.7 | 12.8 | 11.1 | 10.7 | 9.8 | 8.9 |
| Max | 13+ | 13+ | 13+ | 13+ | 13+ | 13+ | 11.5 | 9.5 |
| Min | 13+ | 115 | 8.5 | 12.0 | 8.5 | 9.5 | 7.5 | 7.0 |

These results indicate that 50% butyl is required to get the maximum mounting pressure below 13 bar. At this level HDPE is better than LDPE.

TABLE 5

| LDPE 1 | 50 | — |
|---|---|---|
| LDPE 2 | — | 50 |
| Butyl 1 | 50 | 50 |
| Mean | 20.8 | 9.7 |
| Max | 12.5 | 11.5 |
| Min | 9.0 | 7.0 |

These results indicate that the lower molecular weight LDPE (higher MFI) is better.

TABLE 6

| LDPE 2 | 50 | — |

TABLE 6-continued

| Butyl 1 | 50 | 50 |
|---|---|---|
| Butyl 2 | — | 50 |
| Mean | 9.7 | 10.9 |
| Max | 11.5 | 13+ |
| Min | 7.0 | 9.0 |

These results indicate that the lower molecular weight butyl give the better performance.

TABLE 7

| LDPE 1 | 85 | 42.5 |
|---|---|---|
| SBS | 15 | 7.5 |
| Butyl 1 | — | 50 |
| Mean | 12.8 | 8.3 |
| Max | 13.0 | 10.5 |
| Min | 12.0 | 7.0 |

TABLE 8

| EPM | 70 | 35 |
|---|---|---|
| Oil | 30 | 15 |
| Butyl 1 | — | 50 |
| Mean | 13+ | 11.7 |
| Max | 13+ | 13+ |
| Min | 13+ | 4.5 |

EXAMPLE 5

The final composition in Table 4 (50 HDPE, 50 Butyl 1) is used for lining 30 bottles of the size and with the filling shown in Example 4 on a commercial bottling machine. The mean, maximum and minimum values are 6.75, 8.05 and 5.60 bars.

While preferred embodiments of this invention have been described in detail hereinabove, it is to be understood that many changes and modifications may be made by those skilled in the art without departing from the scope and spirit of this invention.

What is claimed:

1. A beer bottle comprising a bottle, a cap and a sealing gasket that is between the bottle and the cap, the bottle being filled with beer, the gasket is formed of a homogeneous blend of a thermoplastic composition of from about 20 to about 60% by weight butyl rubber and about 40% to about 80% by weight of thermoplastic polymer and wherein the gasket has been formed by placing a molten piece of the thermoplastic composition in the cap and then molding the molten composition to form the gasket.

2. A beer bottle comprising a bottle filled with beer, a cap and a sealing gasket molded to the cap and positioned between the bottle and the cap wherein the gasket is a homogeneous blend of from about 20 to about 60% by weight of the composition of butyl rubber and about 40% to about 80% by weight of the composition of one or more thermoplastic polymers and wherein the gasket is capable of preventing ingress of volatile chlorinated substances into the beer.

3. The bottle of claim 2 wherein the butyl rubber is present in an amount of from about 30 to about 50% by weight of the composition.

4. The bottle of claim 2 wherein the butyl rubber is a copolymer of isoprene and butylene having a Mooney viscosity (MLI+8 at 110° C.) of below 50.

5. The bottle of claim 2 wherein the thermoplastic polymer is selected from the group consisting of polyethylene, polyethylene copolymer with other lower alkylenes, polypropylene, thermoplastic rubbers, ethylene propylene copolymers, acid modified ethylene propylene copolymers, styrene butadiene rubber, carboxylated styrene butadiene, polyisoprene, styrene isoprene styrene block copolymers, styrene butadiene styrene block copolymers, styrene ethylene butylene styrene block copolymers, polystyrene, ethylene vinyl acetate copolymers, ehtylene (meth) acrylate copolymers and ethylene vinyl alcohol copolymers.

6. A beer bottle comprising a bottle, a cap and a sealing gasket that is between the bottle and the cap and a package that includes a source of volatile chlorinated phenol and/or chlorinated anisole, the bottle being filled with beer and wherein the gasket is formed of a homogeneous blend of a thermoplastic composition of from about 20% to about 60% by weight butyl rubber and about 40% to about 80% by weight of thermoplastic polymer.

7. The bottle of claim 6 wherein the package is selected from the group consisting of a wood pallet, a crate and a container containing wood, and wherein the wood has been impregnated with a chlorinated phenol wood presentation.

* * * * *